(12) United States Patent
Paraglos et al.

(10) Patent No.: US 7,177,471 B2
(45) Date of Patent: Feb. 13, 2007

(54) SHAPE PRIORS FOR LEVEL SET REPRESENTATIONS

(75) Inventors: Nikolaos Paraglos, Plainsboro, NJ (US); Mikael Rousson, Preaux (FR)

(73) Assignee: Siemens Corporate Research, Inc., Princeton, NJ (US)

( * ) Notice: Subject to any disclaimer, the term of this patent is extended or adjusted under 35 U.S.C. 154(b) by 785 days.

(21) Appl. No.: 10/356,093

(22) Filed: Jan. 31, 2003

(65) Prior Publication Data
US 2004/0019467 A1    Jan. 29, 2004

Related U.S. Application Data

(60) Provisional application No. 60/354,005, filed on Feb. 1, 2002, provisional application No. 60/354,004, filed on Feb. 1, 2002, provisional application No. 60/353,371, filed on Feb. 1, 2002.

(51) Int. Cl.
G06K 9/46    (2006.01)

(52) U.S. Cl. .................................. 382/173; 382/203

(58) Field of Classification Search ................ 382/103, 382/104, 107, 128, 173, 180, 195, 199, 203
See application file for complete search history.

(56) References Cited

U.S. PATENT DOCUMENTS 6,031,935 A    2/2000    Kimmel ...................... 382/173

OTHER PUBLICATIONS

Rousson et al., "Shape Priors for Leve Set Representations," *Proc. 7th European Conf. on Computer Vision*, Part II, LNCS vol. 2351, May 2002, pp. 78-92.*

Leventon et al., "Level Set Based Segmentation with Intensity and Curvature Priors," *Proc. IEEE Workshop on Mathematical Methods in Biomedical Image Analysis*, Jun. 2000, pp. 4-11.*

Adalsteinsson et al., "A Fast Level Set Method for Propagating Interferences," *Journal of Computational Physics*, vol. 118, 1995, pp. 269-277.*

Yunmei Chen et al: On the incorporation of shape priors into geometric active contours Proceedings IEEE Workshop on Variational and Level Set Methods in Computer Vision, Proceedings of 1st IEEE Workshop on Computer Vision, Nancouver, BC Canada, Jul. 13, 2001, pp. 145-152, XP002240267 2001, Los Alamitos, CA, USA, IEEE Computer Soc, USA ISBN: 0-7695-1278-X the whole document.

(Continued)

*Primary Examiner*—Andrew W. Johns
(74) *Attorney, Agent, or Firm*—Donald B. Paschburg; F. Chau & Associates, LLP

(57) ABSTRACT

This invention relates to shape priors for level set representations. An embodiment of the invention comprises a first stage and a second stage. In the first stage, a shape model can be built directly on level set space using a collection of samples. The shape model can be constructed using a variational framework to create a non-stationary pixel-wise model that accounts for shape variabilities. Then, in the second stage, the shape model can be used as basis to introduce the shape prior in an energetic form. In terms of level set representations, the shape prior aims at minimizing non-stationary distance between the evolving interface and the shape model. An embodiment according to the present invention can be integrated with an existing, data-driven variational method to perform image segmentation for physically corrupted and incomplete data.

13 Claims, 4 Drawing Sheets

OTHER PUBLICATIONS

Samson C et al: "Ä level set model for image classification: Scale-Space Theories in Computer Vision, Second International Conference, Scale-Space '99. Proceedings, Corfu, Greece, Sep. 26-27, 1999, Lecture Notes in Computer Science vol. 1682, pp. 306-317, XP009010364 1999, Berlin, Germany, Springer-Verlag, Germany ISBN: 3-540-66498-X abstract section 3.

Yahia H M et al: "Segmentation of deformable templates with level sets characterized by particle systems" Pattern Recognition, 1998, Proceedings. Fourteenth International Conference on Brisbane, Old., Australia Aug. 16-20, 1998, Los Alamitos, CA, USA, IEEE Comput. Soc, US, Aug. 16, 1998. pp. ISBN: 0-8186-8512-3 abstract section 3.

* cited by examiner

SHAPE PRIORS FOR LEVEL SET REPRESENTATIONS

CROSS REFERENCE TO RELATED APPLICATION

This application claims the benefit of U.S. Provisional Application Ser. No. 60/354,005 filed on Feb. 1, 2002, U.S. Provisional Application Ser. No. 60/354,004 filed on Feb. 1, 2002, and U.S. Provisional Application Ser. No. 60/353,371 filed on Feb. 1, 2002, which are incorporated by reference herein in their entirety.

FIELD OF THE INVENTION

This invention relates to the use of prior knowledge within level set representations that can be used in conjunction with computer vision applications, such as, segmentation, tracking, and reconstruction, that are used in various domains, for example, medical, surveillance, and automotive.

BACKGROUND OF THE INVENTION

Level set representations are the most common choice for the implementation of variational frameworks in computer vision since they are implicit, intrinsic, parameter and topology free.

A use of level set representations to deal with computer vision related problems has increased within the computer vision community. Prior art techniques based on these methods and used in the computer vision application domain are wide and not restricted to image segmentation, restoration, impainting, tracking, shape from shading, three dimensional reconstruction, and medical image segmentation.

Level set methods have been exhaustively studied and are also applied to other scientific domains, such as, geometry, robotics, fluids, and semiconductor design. Many of the application domains share a common concern, that is, tracking moving interfaces. Level set representations are computational methods that are well suited to perform the task of tracking moving surfaces. Level set representations can be used in any dimension, for example, curves, surfaces, and hyper-surfaces, and are parameter free. Level set representations can change, naturally, the topology of an evolving interface. Moreover, level set representations provide a natural way to determine and estimate geometric properties of an evolving interface.

Level set representation techniques are well suited to deal with non-rigid objects and motions, since the techniques refer to local characteristics and can deform an interface pixel-wise. When solid/rigid motions and objects are considered, the techniques exhibit a limited performance as compared to parametric methods that can capture a rigid/solid objects structure well. This difference is due to the fact that local propagation is very sensitive and fails to take full advantage of well determined physical constraints, such as, solid shape models. It is clear, that evolving interfaces are powerful tools when using level set representations, that have certain strengths and some limitations. For example, the property of locality is not helpful when a considered task refers to the extraction of solid objects; however, the property of locality is a vital element when a considered task refers to non-rigid motions and objects.

Visual space comprises objects from both categories. For example, most active human organs cannot be considered solid, but at the same time, forms of active human organs are well constrained within a family of shapes that cannot be fully characterized using parametric models. The use of level set based methods are suitable for this type of application due to their ability to deal with local deformations. Moreover, the use of shape prior knowledge is a valuable element that can further improve the performance of these methods.

Therefore, a need exists for the ability to constrain level set representations to follow a shape global consistency while preserving the ability to capture local deformations.

SUMMARY OF THE INVENTION

A method according to an embodiment of the present invention comprises a mathematical functional that accounts for global/local shape properties of an object that is to be recovered, wherein the mathematical functional can be combined with any level set objective function having a shape model with a degree of variability.

Another method according to an embodiment of the present invention comprises a first stage and a second stage. In the first stage, a shape model can be built directly on level set space using a collection of samples. The shape model can be constructed using a variational framework to create a non-stationary pixel-wise model that accounts for shape variabilities. Then, in the second stage, the shape model can be used as basis to introduce the shape prior in an energetic form. In terms of level set representations, the shape prior minimizes non-stationary distance between the evolving interface and the shape model. An embodiment according to the present invention can be integrated with an existing, data-driven variational method that performs image segmentation for physically corrupted and incomplete data.

The embodiments of the present invention will become more apparent from the following detailed description of illustrative embodiments thereof, which is to be read in connection with the accompanying drawings.

DETAILED DESCRIPTION OF PREFERRED EMBODIMENTS

Figure 1:
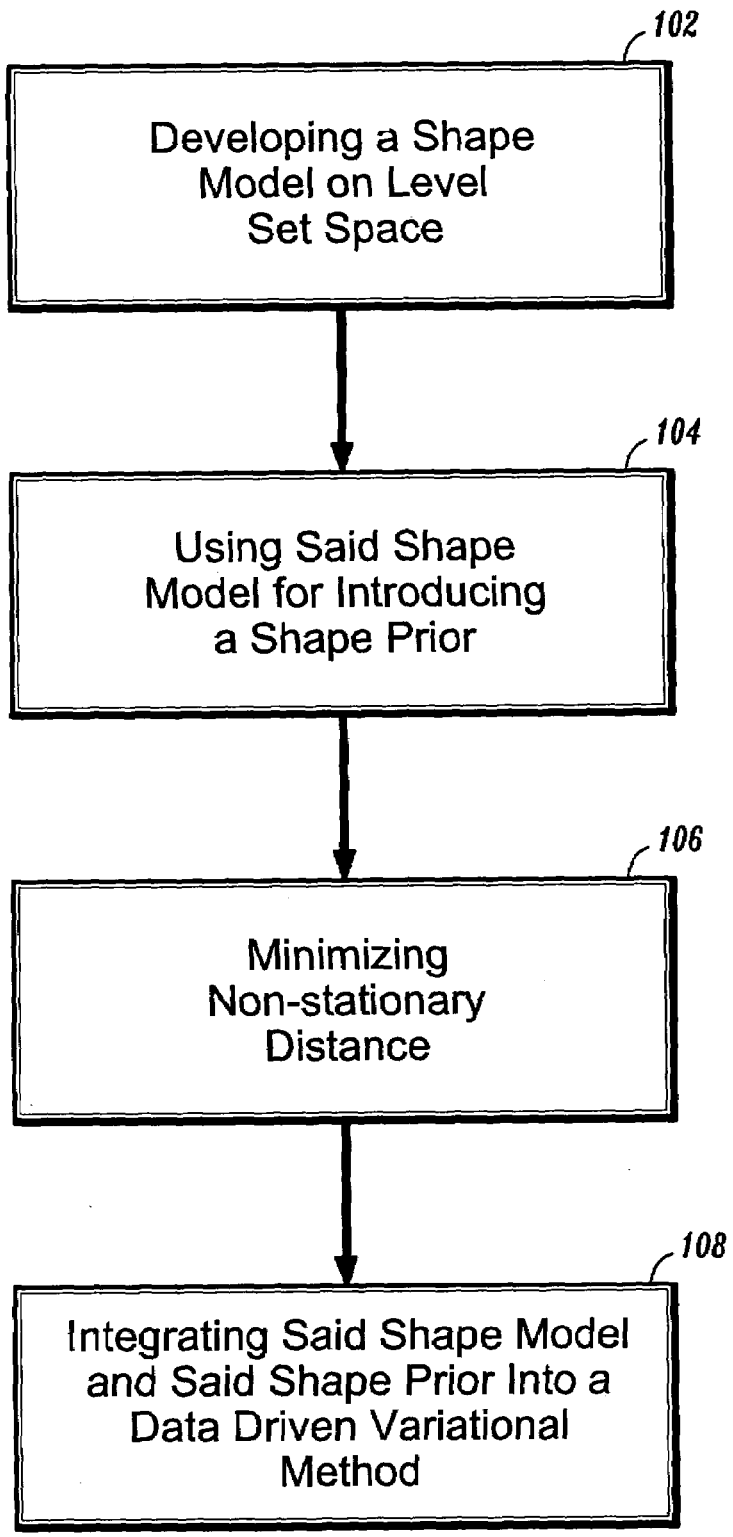
FIG. 1 is a flow diagram illustrating a method using shape priors for level set representation according to an embodiment of the present invention.

Many computer vision applications refer to entities with physical meanings that follow a shape form with a certain degree of variability. Referring to FIG. 1, a method according to an embodiment of the present invention comprises an energetic form that introduces shape constraints to level set representations. Step 102 includes developing a shape model on level set space for tracking moving interfaces. The development of the shape model is described in detail below in Shape Prior Model Construction. In step 104, the shape model of step 102 is then used for introducing a shape prior in an energetic form. The introduction of the shape prior in an energetic form is further described in detail below in Level Set Shape Priors. This formulation of steps 102 and 104 exploits all advantages of level set representations resulting in a method that can deal with a large number of parametric, as well as, continuous transformations. Step 106 depicts minimizing non-stationary distance between an evolving interface and the shape model. This minimization is described in detail below in Minimizing Non-Stationary Distance. Furthermore, as shown in step 108, the formulation can be integrated with existing level set based segmentation methods leading to paradigms that can deal with noisy, occluded, missing and physically corrupted data. The integration is further described in detail below in Self-Constrained Geodesic Active Region.

Figure 2:
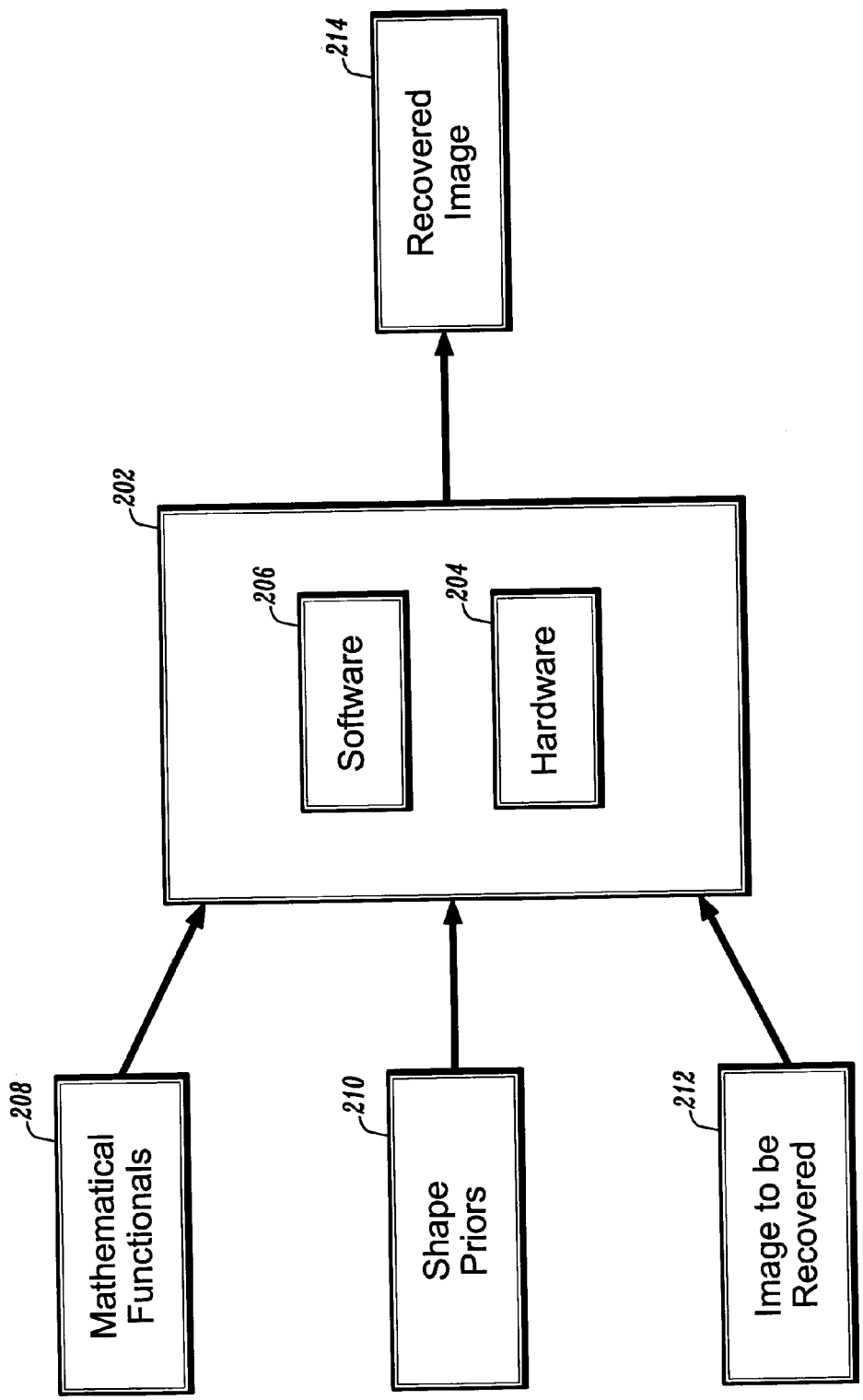
FIG. 2 illustrates is a functional block diagram according to an embodiment of the present invention.

Referring to FIG. 2 a process is illustrated according to an embodiment of the present invention. A computer system 202 having a hardware component 204, for example, a server and storage device, and software component 206, for example, an operating system and computer programs, according to an embodiment of the present invention receives input of mathematical functionals 208, shape priors 210, and an image 212 that is to be recovered. Shape prior propagation and minimization of non-stationary distance are used to produce recovered image 214. The process is now described in detail.

Level Set Representations

A parameterized closed evolving interface in a Euclidean plane can be represented as follows: $[C:[0,1] \rightarrow \Re^2, p \rightarrow C(p)]$ where $C(p,t)$ is a family of interfaces generated by propagation of an initial one $C_0(p)$ in the direction of an inward normal N. Under the assumption that the propagation is guided by a scalar function [F] of the geometric properties of the curve, that is, curvature K, the following motion equation can be derived:

$$\begin{cases} C(p,0) = C_0(p) \\ C_t(p) = F(K(p))N(p) \end{cases}$$

The implementation of this evolution can be performed using a Lagrangian approach. That approach produces associated equations of motion for a position vector $(x,y)=C(p)$. The equation can then be updated according to a difference approximation scheme. As a consequence, the evolving interface cannot change its topology.

Figure 3:
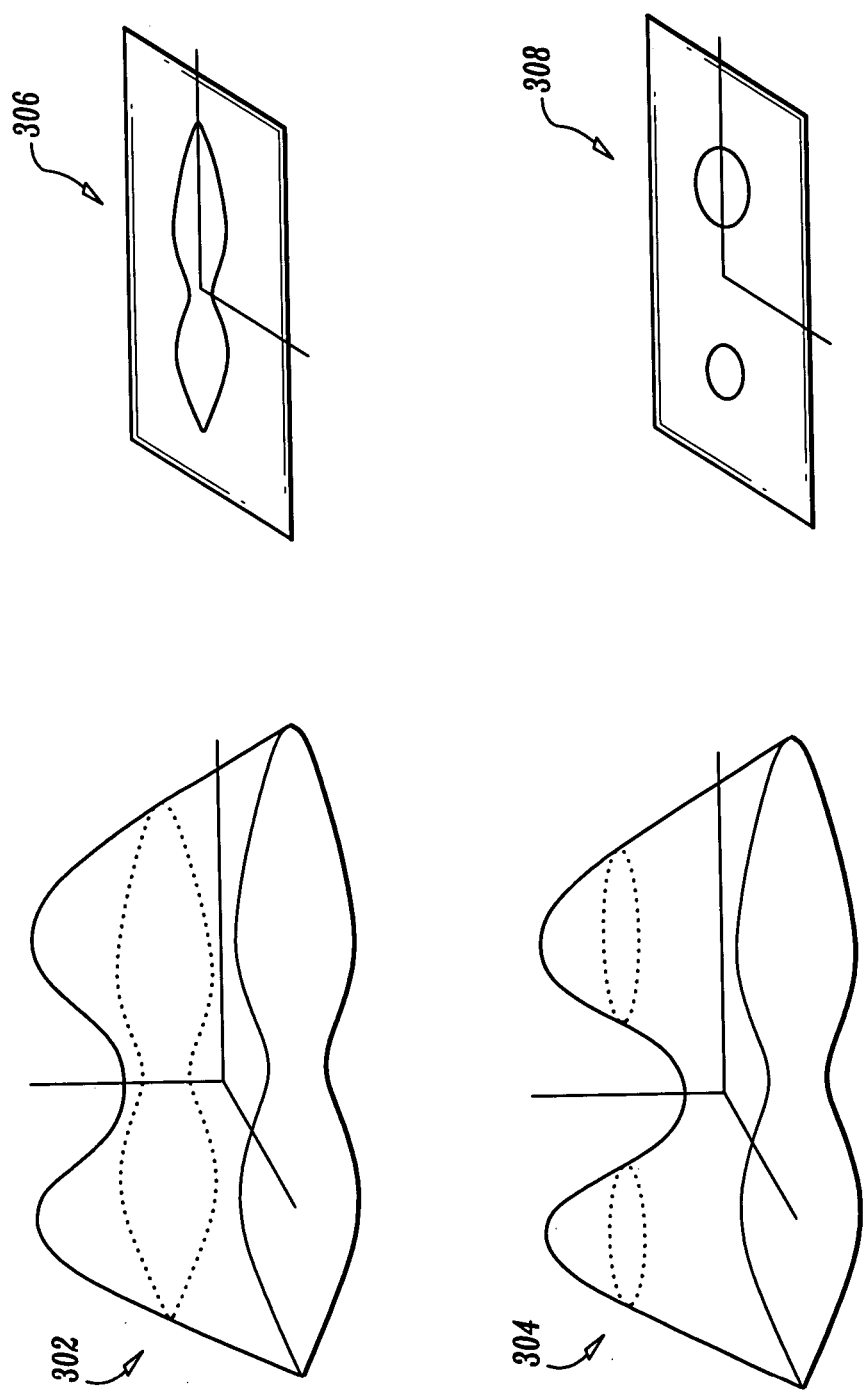
FIG. 3 is a diagram illustrating level set representations and evolving interfaces according to an embodiment of the present invention.

FIG. 3 illustrates level set representations 302 $z=\Phi(x,y,t_1)$, 304 $z=\Phi(x,y,t_2)$ and evolving interfaces 306 $c(t_1)$, 308 $C(t_2)$. To overcome the limitation of not being able to change topology, evolving interface $C(p)$ can be a zero-level set ($\phi=0$) function of a surface z, that is $[z=(x,y,\phi(x,y,t))\in\Re^3]$.

Deriving $\phi(x,y,t)=0$ with respect to time and space results in the following motion for embedding surface $\phi()$:

$$\begin{cases} \phi(C_0(p),0) = 0 \\ \phi_t(p) = -F(K(p))|\nabla\phi(p)| \end{cases}$$

where $[|\nabla\phi|]$ is the norm of gradient and $$\left[N = -\frac{\nabla\phi}{|\nabla\phi|}\right].$$

Thus, a connection between the family of the evolving interfaces $C(p,t)$ and the family of one parameter evolving surfaces $\phi(x,y,t)$ can be established, where zero level set values of the function $\phi$ always yield to the evolving interface.

As a result the embedding surface $\phi(p)$ remains always a function as long as F is smooth and the evolving interface $C(p)$ can change topology. Additionally, numerical simulations on $\phi(p)$ can be developed trivially and intrinsic geometric properties of the evolving interface can be estimated directly from the level set function. Finally, a method according to an embodiment of the present invention can be easily extended for use in higher dimensions. A selection for an embedding function can be a Euclidean distance function.

Shape Prior Model Construction

A vital component for most prior art approaches that aimed at creating shape representations is alignment of training samples.

Matching geometric shapes is an open, as well as, a complex issue in computer vision applications that has been exhaustively studied. To introduce level set priors, matching techniques that have been used in level set priors need to be considered. A point-based correspondence method, as well as, an area-based correspondence method, can be used to register shapes in a common space. According to an area-based method all training samples are registered to a reference shape model by maximizing overlap between the interior areas defined by the reference shape and the training samples.

For alignment, the present invention employs a variational approach based on a shape-to-area principle described in "Non-Rigid Image Registration Using Distance Functions," by Paragyios, et al., U.S. Provisional Patent Application, 10/353,371, which is incorporated by reference herein in its entirety.

An embodiment according to the present invention maximally exploits information of level set representations. The output of the method is a set of N level set representations, one for each training sample $[\hat{\Phi}_i]$, registered to an arbitrarily selected reference shape $[\hat{\Phi}_0]$, that is selected from a family of samples.

A next step can be construction of a shape model using aligned contours. In the prior art, several types of models have been investigated, for example, point-based snake models, deformable models/templates, active shapes, and level set representations. Although these models are powerful enough to capture a certain number of local deformations, the models require a large number of parameters to deal with important shape deformations. Moreover, with the exception of level set methods, the models cannot deal with changes of topology. Finally, extending the models to describe structures of higher dimension other than curves and surfaces, is not trivial.

In level set prior art, two models are available. One model uses a global statistical representation on level set space based on a Principal Component Analysis over a certain number of aligned training samples. While this model is operative, it is based on the condition that several training samples are available during the training phase. In another model, shapes are represented using a collection of points obtained by averaging within a set of aligned training samples.

An advantage of a method according to an embodiment of the present invention is being able to generate a shape model that accounts for local variations of level set space. Referring to FIG. 1, a shape model is developed on level set space (step 102). To generate the shape model, a stochastic framework with two unknown variables is defined as comprising a shape image, $\Phi_M(x,y)$, and local degrees, such as, variability, of shape deformations $\sigma_M(x,y)$ in which each grid location can be described in the shape model using a Gaussian density function as follows:

$$P_{x,y}^M(\phi) = \frac{1}{\sqrt{2\pi}\,\sigma_M(x, y)} e^{-\frac{(\phi-\Phi_M(x,y))^2}{2\sigma_M^2(x,y)}}$$

The mean of this function corresponds to the level set value, while the variance refers to the variation of aligned samples in the location. An additional constraint that mean values of the shape model refer to a signed distance function, such as, a level set representation $\hat{\Phi}_i$, can further be imposed.

Thus, given N aligned training samples, for example, level set representations, in which $\hat{\Phi}_i$ is the aligned transformation of $\Phi_i$, a variational framework for the estimation of the BEST shape by maximizing the local joint densities with respect to $(\Phi_M, \sigma_M)$ can be constructed:

$$E(\Phi_M, \sigma_M) = -\sum_{i=1}^{n} \int\int_{x,y} \log[p_{x,y}^M(\overline{\Phi}_i(\hat{x}, y))]dxdy$$

subject to the constraint: $|\nabla\Phi_M(x,y)|^2=1$, $\forall(x,y)\in\Omega$.

Additionally, spatial coherence on the variability estimates can be enforced by adding a smoothness term. Since the constant term $$(\sqrt{2\pi})$$

does not affect the minimization procedure, the following functional is used:

$$E(\Phi_M, \sigma_M) = (1-\alpha)\int\int_\Omega \left(\left(\frac{d}{dx}\sigma_M(x, y)\right) + \left(\frac{d}{dy}\sigma_M(x, y)\right)^2\right)dxdy + \alpha\int\int_\Omega \sum_{i=1}^{n}\left(\log[\sigma_M(x, y)] + \frac{(\hat{\Phi}_i(x, y) - \Phi_M(x, y))^2}{2\sigma_M^2(x, y)}\right)dxdy$$

subject to the constraint: $|\nabla\Phi_M(x,y)|^2=1$, $\forall(x,y)\in\Omega$, where $[\alpha]$ is balancing the contribution between the data attraction and regularity of the variability field.

The constrained optimization of this functional can be achieved using Lagrange multipliers and a gradient descent method. However, given the form of constraints, that is, involvement of first and second order derivatives, it cannot be proven that a closed form solution cannot be obtained. Additionally, it cannot be proven that the conditions which guarantee the validity of Lagrange theorem are satisfied. Moreover, the number of unknown variables of the system is too high $O(N^2)$ and the system is quite unstable especially when there is large variability among training samples.

By using a two step optimization method according to an embodiment of the present invention, the above limitations can be dealt with. The two step optimization method according to an embodiment of the present invention separates the two conditions. During a first step, an optimal solution is obtained according to data driven terms. During a second step, an optimal projection of the solution of the first step at the manifold of acceptable solutions, such as, distance functions, is determined.

The unknown variables can then be obtained by minimizing the previously defined data-driven objective function that preserves some regularity conditions. This is done using a gradient descent method according to an embodiment of the present invention:

$$\begin{cases} \dfrac{d}{dt}\Phi_M = \alpha\sum_{i=1}^{n}\dfrac{\Phi_i - \hat{\Phi}_M}{\sigma_M^2} \\ \dfrac{d}{dt}\sigma_M = \alpha\sum_{i=1}^{n}\left[-\dfrac{1}{2\sigma_M} + \dfrac{(\Phi - \Phi_M)^2}{\sigma_M^3}\right] + (1-\alpha)\left[\dfrac{\partial^2}{\partial x\partial x}\sigma_M + \dfrac{\partial^2}{\partial y\partial y}\sigma_M\right] \end{cases}$$

while the projection to the manifold space of accepted solutions is done using a heavily considered Partial Differential Equation:

$$\left\{\frac{d}{dt}\Phi_M = (1 - \text{sgn}(\Phi_M^0))(1 - |\nabla\Phi_M|)\right.$$

where $\Phi_M^0$ is the initial representation that is data driven.

These two steps alternate until the system reaches a steady-state solution. Upon convergence of the system, a level set representation model is obtained that optimally expresses the properties of the training set using degrees of variability that are constrained to be locally smooth. The level set representation of the reference sample is used as the initial condition of the system.

Level Set Shape Priors

Presuming an image where an object with a shape form similar to one of the training samples is present, a method according to an embodiment of the present invention advantageously allows recovering an area of the image that corresponds to the object. To illustrate this, a model without any data-driven term can be defined.

Shape-Driven Propagation

A Lipchitz function, $\Phi:\Omega\times\Re^+\to\Re^+$, that refers to level set representation that is evolving over time [t] is defined as, $$\Phi(x, y; t) = \begin{cases} 0, (x, y)\partial\Re(t) \\ +D((x, y), \partial\Re(t)) > 0, (x, y) \in \Re(t) \\ -D((x, y), \partial\Re(t)) < 0, (x, y) \in [\Omega - \Re(t)] \end{cases}$$

where $\partial\Re(t)$ refers to an interface, such as, boundaries, of $\Re(t), D((x,y), \partial\Re(t))$, which is the minimum Euclidean distance between the pixel $(x,y)$ and the interface $\Re(t)$ at time t. The approximations of DIRAC and HEAVISIDE distributions can be defined as:

$$\delta_\alpha(\phi) = \begin{cases} 0, |\phi| > \alpha \\ \dfrac{1}{2\alpha}\left(1 + \cos\left(\dfrac{\pi\phi}{\alpha}\right)\right), |\phi| < \alpha \end{cases}$$

$$H_\alpha(\phi) = \begin{cases} 1, \phi > \alpha \\ 0, \phi < -\alpha \\ \dfrac{1}{2}\left(1 + \dfrac{\phi}{\alpha} + \dfrac{1}{\pi}\sin\left(\dfrac{\pi\phi}{\alpha}\right)\right), |\phi| < \alpha \end{cases}$$

Then it is shown that $$\{(x,y)\in\Omega: \lim_{\alpha\to 0+}[H_\alpha(\Phi((x,y);t))]=1\}=\Re$$

$$\{(x,y)\in\Omega: \lim_{\alpha\to 0+}[\delta_\alpha(\Phi((x,y);t))]=1\}=\delta\Re$$

Referring to FIG. 1, a shape model is used to introduce a shape prior (step 104). Given an interface and consequently, its level set representation, the interface can be evolved to recover a structure that respects some known shape properties $\Phi_M(x,y)$. This presumes all instances of the evolving representation belong to the family of shapes that is generated by applying all possible global transformations to the prior shape model. This presumption is valid for rigid objects, but it will fail when non-rigid objects are considered and therefore local deformations have to be accounted for.

Given the current level set representation $\Phi$, there is an ideal transformation $A=(A_x,A_y)$ between the shape prior and the observed representation. Presuming that noise does not affect measure and there are not any scale variations, an optimal transformation will satisfy the following conditions, $$\Phi(x,y) \approx \Phi_M(A(x,y)), \forall (x,y): H_\alpha(\Phi(x,y)) \geq 0.$$

By considering an optimization criterion, such as the sum of squared differences, an optimal transformation A will minimize the following functional:

$$E(\Phi,A) = \iint_{106} H_\alpha(\Phi(x,y))(\Phi(x,y) - \Phi_M(A(x,y)))^2 dxdy.$$

To account for scale variations, presume the existence of a scale component S for the transformation A. Then it is determinable that the level set representations are invariant to translation and rotation but not in scale variations. However, given the characteristics of distance functions from an interface, it can be determined how scale changes will affect the information space, that is, the level set representation values will be also scaled up/down according to a scale variable, resulting in:

$$E(\Phi,A) = \iint_{106} H_\alpha(\Phi(x,y))(s\Phi(x,y) - \Phi_M(A(x,y)))^2 dxdy$$

To minimize the above functional with respect to the evolving level set representation and the global linear transformation, presume without loss of generality, that the functional is composed of M+1 motion parameters $A=[s, \alpha_1, \alpha_2, \ldots, \alpha_M]$. Then, using the calculus of variations, the following system of motion equations can be obtained:

$$\begin{cases} \frac{d}{dt}\Phi = -2sH_\alpha(\Phi)(s\Phi - \Phi_M(A)) + \delta_\alpha(\Phi)(s\Phi - \Phi_M(A))^2 \\ \forall j \in [1, M], \\ \frac{d}{dt}\alpha_j = 2\iint_\Omega \left[ H_\alpha(\Phi)\left( (s\Phi - \Phi_M(A))\left( \nabla\Phi_M(A) \cdot \frac{\partial}{\partial \alpha_j}(A_x, A_y) \right) \right) \right] \end{cases}$$

-continued $$\left| \frac{d}{dt}s = -2\iint_\Omega \left[ H_\alpha(\Phi)\left( (s\Phi - \Phi_M(A))\left( \Phi - \nabla\Phi_M(A) \cdot \frac{\partial}{\partial_s}(A_x, A_y) \right) \right) \right] \right.$$

Figure 4:
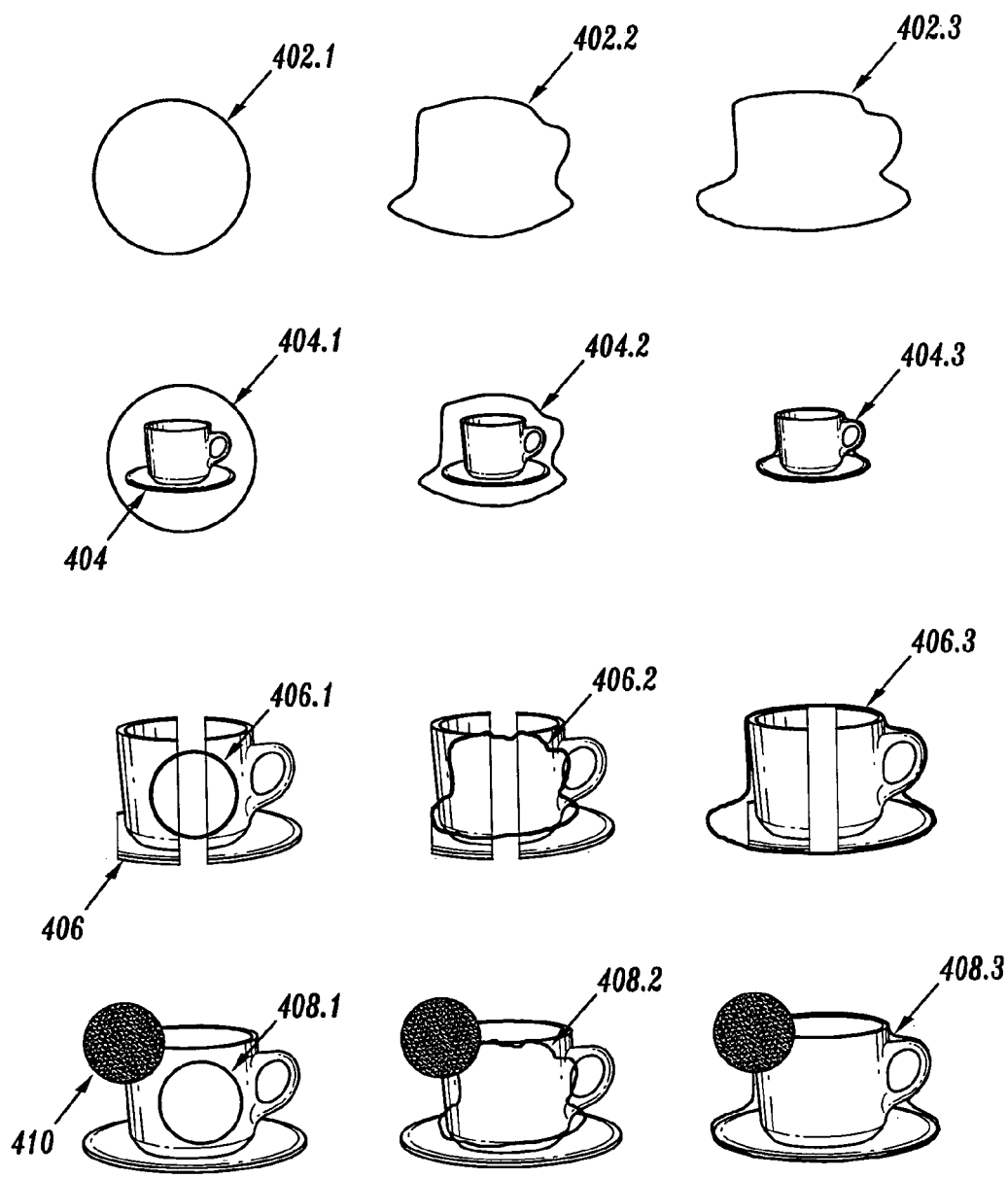
FIG. 4 illustrates application of a process according to an embodiment of the present invention.

Referring to FIG. 4, having a shape prior of a cup (not shown) and no image, shape-driven propagation is used to generate shapes 402.1, 402.2, and 402.3, illustrating the transition of shapes based on the above equations.

The obtained motion equation for the time evolving level set representation can then be interpreted term by term. To facilitate the interpretation let $\Phi \to 0$:

The first term $[-2sH_\alpha(\Phi))(s\Phi - \Phi_M)(A))= \Phi_M(A)]$ is positive when $\Phi_M(A)$ is positive. The physical meaning of this condition is that the projection of a considered pixel is interior to the shape prior interface. Therefore, the evolving interface has to expand locally since the embedded function refers to positive values inside the interface and negative outside the interface. This results in a better local fit between the model and the current level set representation. A similar interpretation can be given for the opposite case.

The second term is a constant shrinking force that varies locally according to a match between the current level set representation and the prior shape model. Therefore, that force can be ignored.

Although a static model can demonstrate moderate performance it does not take into account local shape variations. The shape model can have some local degrees of variability. In that case, an ideal transformation will map each value of current representation at the most probable value on the model:

$$(x,y) \to A(x,y)$$

$$\max_{x,y}\{p_{A(x,y)}^M(s\Phi(x,y))\} \forall (x,y): H_\alpha(\Phi(x,y)) \geq 0$$

The most probable transformation is the one that maximizes the joint density for all pixels. Presuming that these densities are independent across pixels, the minimization of the −log function of the joint density can be considered as global optimization criterion. This criterion refers to two sets of unknown variables. The linear transformation A, and the level set function $\Phi$:

$$E(\Phi,A) = -\iint_{106} H_\alpha(\Phi(x,y))\log[p_{A(x,y)}^M(s\Phi(x,y))]dxdy,$$

leading to the following optimization functional:

$$E(\Phi, A) = \iint_\Omega H_\alpha(\Phi(x, y))\left[\log(\sigma_M(A(x, y))) + \frac{(s\Phi(x, y) - \Phi_M(A(x, y)))^2}{2\sigma_M^2(A(x, y))}\right]dxdy.$$

Thus, a transformation and a level set representation that maximize the posterior probability pixel-wise given the shape prior model can be determined. The transformation and a level set representation refers to a non-stationary measurement where pixels are considered according to the confidence of their projections in the shape prior model, that is, their variance term.

Minimizing Non-Stationary Distance

Referring to FIG. 1, non-stationary distance is minimized (step 106). The minimization of this functional can be performed using a gradient descent method:

$$\begin{cases} \dfrac{d}{dt}\Phi = -sH_\alpha(\Phi)\left[\dfrac{(s\Phi-\Phi_M(A))}{\sigma_M^2(A)})\right] - \delta_\alpha(\Phi)\left[\log(\sigma_M(A)) + \dfrac{(s\Phi-\Phi_M(A))^2}{2\sigma_M^2(A)})\right] \\ \forall_j \in [1, M], \\ \dfrac{d}{dt}\alpha_j = -2\int\int_\Omega H_\alpha(\Phi)\left[\dfrac{1}{2\sigma_M(A)}\nabla\sigma_M(A)\cdot\dfrac{\delta}{\delta a_j}(A_x, A_y) - \right. \\ \left. \dfrac{(s\Phi-\Phi_M(A))\left[\nabla\Phi_M(A)\cdot\dfrac{\delta}{\delta_s}(A_x, A_y)\right]}{\sigma_M^2(A)} - \dfrac{(s\Phi-\Phi_M(A))^2\left[\nabla\sigma_M(A)\cdot\dfrac{\delta}{\delta\alpha_j}(A_x, A_y)\right]}{\sigma_M^3(A)}\right] \\ \dfrac{d}{dt}s = -2\int\int_\Omega H_\alpha(\Phi)\left[\dfrac{1}{2\sigma_M(A)}\nabla\sigma_M(A)\cdot\dfrac{\delta}{\delta_s}(A_x, A_y) + \right. \\ \left. \dfrac{(s\Phi-\Phi_M(A))\left[\Phi-\nabla\Phi_M(A)\cdot\dfrac{\delta}{\delta_s}(A_x, A_y)\right]}{\sigma_M^2(A)} - \dfrac{(s\Phi-\Phi_M(A))^2\left[\nabla\sigma_M(A)\cdot\dfrac{\delta}{\delta_s}(A_x, A_y)\right]}{\sigma_M^3(A)}\right] \end{cases}$$

Referring to FIG. 1, the shape model and the shape prior are integrated into a data driven method (step 108). According to an embodiment of the present invention, the obtained motion equations have the same interpretation as the equations illustrated above without the local variability factor. In the absence of a data driven term, the equations will have the same behavior as the equations that do not account for local variability. Alternatively, integration of the shape prior model with data driven terms can provide a soft-to-hard constraint.

To demonstrate the efficiency of the functional, the functional can be integrated with an existing well known data-driven variational framework for image segmentation. Furthermore, the performance of the completed framework can be compared with the framework obtained when no shape prior model is used.

Self-Constrained Geodesic Active Region

The geodesic active region model is aimed at combining boundary properties, in the form of Geodesic Active Contours, with some regional/global properties of an object to be recovered. The geodesic active region model makes the assumption that a priori knowledge regarding the global region/statistical properties, for example, intensities, optical flow, and texture information, is available.

The original geodesic active region model is defined on an image plane, and the obtained motion equation can be implemented using a level set representation. According to an embodiment of the present invention, a self-constrained version of this model, directly on level set representation space, can be achieved. Thus, if some region-based image-based descriptor functions $p_i$ are available that capture the intensity properties of each region, then an objective functional can be defined as:

$$E(\Phi_i, A_i) = a\sum_{i=1}^{N}\int\int_\Omega \delta_\alpha(\Phi_i(x, y))g(|\nabla I(x, y)|)|\nabla\Phi_i(x, y)| + $$
$$b\sum_{i=1}^{N}\int\int_\Omega [H_\alpha(\Phi_i(x, y))g(p_i(I(x, y))) + (1 - H_\alpha(\Phi_i(x, y))g(p_0(I(c, y)))] + $$
$$c\sum_{i=1}^{N}\int\int_\Omega H_\alpha(\Phi_i(x, y))\left[\log(\sigma_{Mi}(A_i(x, y))) + \dfrac{s\Phi_i(x, y) - \Phi_{M,i}(A_i(x, y)))^2}{2\sigma_{M,i}^2(A_i(x, y))}\right]$$

where $p_0$ is a descriptor function that captures the background properties.

The minimization of this function with respect to the time evolving level set representations $\Phi_i$ can be done using the calculus of variations and the following equations are obtained:

$$\begin{cases} \forall_i \in [1, N], \\ \dfrac{d}{dt}(\Phi_i) = a\delta_\alpha(\Phi_i)\left[g(I)K\dfrac{\nabla\Phi_i}{|\nabla\Phi_i|} - \nabla g(I)\nabla\Phi_i\right] + b\delta_\alpha(\Phi_i)[g(p_i(I)) - g(p_0(I))] - \\ cH_\alpha(\Phi_i)s\dfrac{(s\Phi_i - \Phi_{M,i}(A_i))}{\sigma_{M,i}^2} - c\delta_\alpha(\Phi_i)\left[\log(\sigma_M, i(A_i) + \dfrac{(s\Phi_i - \Phi_{M,i}(A_i))^2}{2\sigma_{M,i}^2(A_i)}\right] \end{cases}$$

The equations comprise three forces acting locally on the evolving interface all in the direction of the normal. The three forces are an image-driven boundary force that shrinks the evolving interface, constrained by a curvature effect, towards the object boundaries, an image-driven region/statistical force that shrinks or expands the evolving interface towards the direction that optimizes the separation between the background pixels and the object pixels according to some predefined global statistical properties, and a shape-driven force that shrinks or expands the evolving interface towards the direction that produces a segmentation result which satisfies some predefined shape constraints.

Referring to FIG. 4, having a shape prior of a cup (not shown) and an image 404 inside the shapes 404.1, 404.2, 404.3, shape-driven propagation and minimization of non-stationary distance are used to generate shapes 404.1, 404.2, and 404.3, illustrating the transition of shapes to conform to an image 404 based on the above equations when the image 404 is inside shape 404.1, 404.2, 404.3. Further depicted are the shapes generated 406.1, 406.2, and 406.3 when an image 406 is outside the shape; Shapes 408.1, 408.2, and 408.3 are generated when an image 408 is outside the shape and the image has corrupted data 410.

In the absence of regional information, a subset of the Geodesic Active Regions that makes use of boundary information can be used. Additionally, alternative variational frameworks can be used.

Level set implementation can be performed using a Narrow Band Method. The essence of a Narrow Band method is to perform the level set propagation only within a limited zone, a parameter of the DIRAC and HEAVISIDE distributions, that is located around the latest position of tile propagating contours in the inward and outward direction. Thus, the working area is reduced significantly resulting on a significant decrease of the computational complexity per iteration. However, this method requires a frequent re-initialization of the level set functions that can be performed using a Fast Marching algorithm.

A method of an embodiment according to the present invention, comprises defining shape prior models in the level set representations space according to probabilistic principles. Such shape prior models can be obtained through a constrained optimization variational framework that exploits maximally the information of the level set representations accounting for local degrees of variability.

Another method according to an embodiment of the present invention, comprises an energetic term that accounts for shape priors in level set representations. The energetic term can be defined directly on the level set space and can deal with global transformations. Moreover, it can account for local variations due to a shape prior model.

Another method according to an embodiment of the present invention integrates shape prior models in the level set representations space according to probabilistic principles and an energetic term that accounts for shape priors in level set representations into a Geodesic Active Region model. The resulting functional refers to a joint optimization approach that can deal with important shape deformations, as well as with noisy, physically corrupted, and occluded data.

Moreover, the shape prior model can account for local degrees of variability which is not the case in prior art. Additionally, a method according to an embodiment of the present invention advantageously does not require a significant number of samples as does the prior art. This allows for the shape prior term to be able to account for a large variety of global transformations and additionally, can deal with important local shape variations.

A method according to an embodiment of the present invention estimates a transformation where a shape-to-area approach maximally exploits information of the level set representations wherein pixel-wise shape correspondence is considered. Moreover, a further advantage of the present invention is that the extension of the proposed framework to deal with objects of any arbitrary dimension is trivial.

The teachings of the present disclosure are preferably implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more Central Processing Units ("CPUs"), a Random Access Memory ("RAM"), and Input/Output ("I/O") interfaces. The computer platform may also include an operating system and micro instruction code. The various processes and functions described herein may be either part of the micro instruction code or part of the application program, or any combination thereof, which may be executed by a CPU. In addition, various other peripheral units may be connected to the computer platform such as an additional data storage unit and an output unit.

It is to be further understood that, because some of the constituent system components and steps depicted in the accompanying drawings may be implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for using shape priors for level set representations comprising the steps of:
developing a shape model on level set space for tracking moving interfaces that are used in at least one of a plurality of applications occurring in at least one of a plurality of domains;
using said shape model for introducing a shape prior in an energetic form; and
recovering an object of interest by minimizing non-stationary distance between an evolving interface and said shape model.

2. The method of claim 1, further comprising the step of integrating said shape model and said shape prior in energetic form into a data-driven variational method that performs image segmentation.

3. The method of claim 1, wherein developing a shape model includes using a collection of samples.

4. The method of claim 1, wherein said shape model is developed using a variational framework to create a non-stationary pixel-wise model that accounts for shape variabilities.

5. The method of claim 1, wherein said at least one of a plurality of applications includes one or more of segmentation, tracking, and reconstruction.

6. The method of claim 1, wherein said at least one of a plurality of domains includes one or more of medical, surveillance, and automotive.

7. A program storage device readable by machine, tangibly embodying a program of instructions executable by the machine to perform method steps for using shape priors for level set representations, the method steps comprising:

developing a shape model on level set space for tracking moving interfaces that are used in at least one of a plurality of applications occurring in at least one of a plurality of domains;

using said shape model for introducing a shape prior in an energetic form; and recovering an object of interest by minimizing non-stationary distance between an evolving interface and said shape model.

8. The program storage device of claim 7, wherein the method steps further comprise the step of minimizing non-stationary distance between an evolving interface and said shape model.

9. The program storage device of claim 8, wherein the method steps further comprise the step of integrating said shape model and said shape prior in energetic form into a data-driven variational method that performs image segmentation.

10. The program storage device of claim 7, wherein the method step of developing a shape model includes using a collection of samples.

11. The program storage device of claim 7, wherein the shape model is developed using a variational framework to create a non-stationary pixel-wise model that accounts for shape variabilities.

12. The program storage device of claim 7, wherein said at least one of a plurality of applications includes one or more of segmentation, tracking, and reconstruction.

13. The program storage device of claim 7, wherein said at least one of a plurality of domains includes one or more of medical, surveillance, and automotive.

* * * * *

UNITED STATES PATENT AND TRADEMARK OFFICE
CERTIFICATE OF CORRECTION

PATENT NO. : 7,177,471 B2  Page 1 of 1
APPLICATION NO. : 10/356093
DATED : February 13, 2007
INVENTOR(S) : Nikolaos Paragios and Mikael Rousson It is certified that error appears in the above-identified patent and that said Letters Patent is hereby corrected as shown below:

Title page, item [75] inventor: 1st inventor name should be -- Nikolaos Paragios --

Signed and Sealed this

First Day of May, 2007

JON W. DUDAS
*Director of the United States Patent and Trademark Office*